United States Patent [19]
Hullett

[11] 3,916,554
[45] Nov. 4, 1975

[54] ANGLERS ACCESSORY

[76] Inventor: Joseph E. Hullett, Rte. 5, Prior Lake, Minn. 55372

[22] Filed: July 12, 1974

[21] Appl. No.: 488,043

[52] U.S. Cl. .............................................. 43/17
[51] Int. Cl.² .................................... A01K 97/12
[58] Field of Search .......................... 43/17, 16, 24

[56] References Cited
UNITED STATES PATENTS

| | | | |
|---|---|---|---|
| 2,931,122 | 4/1960 | Thordson et al. | 43/17 |
| 3,057,105 | 10/1962 | Moses | 43/16 |
| 3,143,822 | 8/1964 | Schooley | 43/24 |
| 3,646,698 | 3/1972 | Zachae | 43/17 |

Primary Examiner—Hugh R. Chamblee
Assistant Examiner—Peter K. Skiff
Attorney, Agent, or Firm—Merchant, Gould, Smith, Edell, Welter & Schmidt

[57] ABSTRACT

An improved bite signal accessory for fishing rods constructed for ready attachment to and adjustment along the rod, and including line gripping means for frictionally and releasably holding a line at the base of the accessory.

4 Claims, 6 Drawing Figures

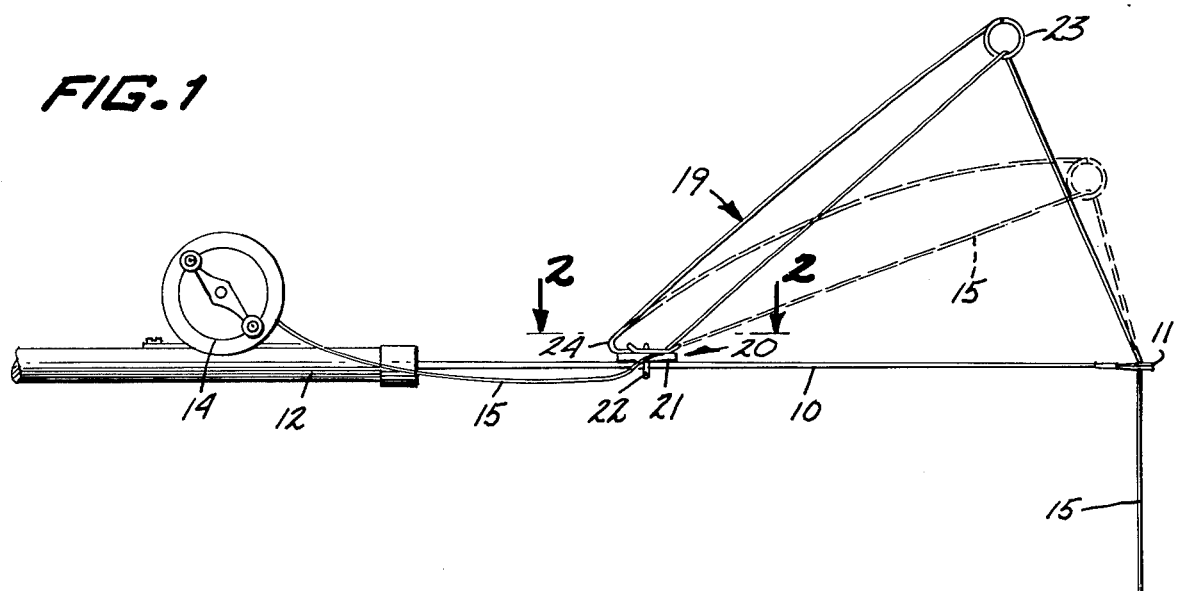
FIG.1
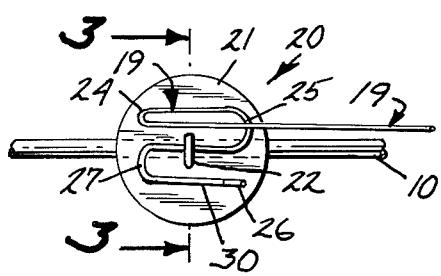
FIG.2
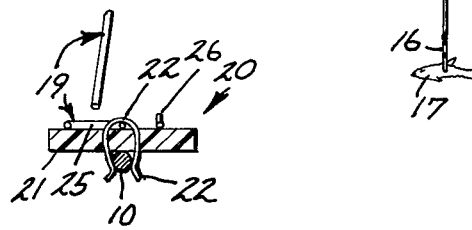
FIG.3
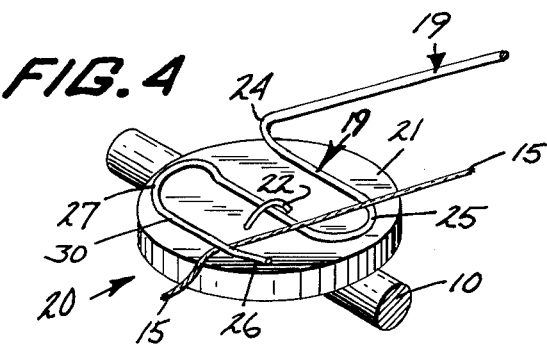
FIG.4
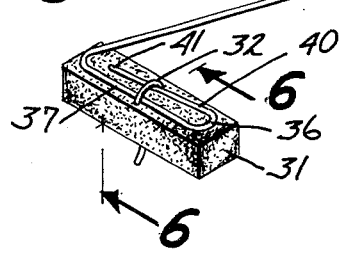
FIG.5
FIG.6

ANGLERS ACCESSORY

BACKGROUND OF THE INVENTION

The present invention relates to the general field of fishermen's accessories, and particularly to visual-type bite signal accessories for reel-equipped fishing rods more especially for use in ice-fishing. Such accessories are not broadly new, and one device of this sort is taught in Schooley Pat. No. 3,143,822. It comprises a resilient arm or finger projecting from the rod at an angle and carrying an eyelet at its other end: the line from the reel passes through the eyelet and then through the tip of the rod before going into the water. When a fish is biting the finger moves visibly with respect to the rod tip, attracting the anglers' attention.

This arrangement has certain disadvantages. In the first place the finger is secured to the rod by lashing a cord about a shank of the finger. The lashing is tight and must be so to hold the finger on the rod. The position of the finger along the rod is not readily adjusted therefore, and moreover the angler must be satisfied with the amount of resiliency inherent in a single finger. Further, there is no way to allow slack in the line between the finger and the reel, which is often advantageous to allow the fish to run initially with the bait before the hook is set.

SUMMARY OF THE INVENTION

The present invention includes means for quickly and releasably securing a bite signal to a rod, thus permitting easy adjustment of the signal along the rod as desired by the angler, and also enabling him to substitute other signals of different resiliencies according to the fishing conditions. The invention also includes an arrangement by which the line is releasably and frictionally gripped at the base of the signal, permitting the angler to draw line from the reel and allow any desired slack at that point while still maintaining the bait, usually a live bait, at the desired depth in the water.

It is accordingly a principal object of the invention to provide an improved anglers' accessory. Another object is to provide a combined bite signal and line grip which is readily attached to and removed from a fishing rod. A further object is to provide means enabling a fisherman to draw desired slack from a reel while still maintaining his bait at a desired depth in the water. A more specific object is to provide an anglers' accessory including a bite signal unitary with line gripping means, both secured to a rod by a bifurcated resilient member which also secures the accessory to the fishing pole.

Various other objects, advantages, and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing FIG. 1 shows one embodiment of my invention in use;

FIG. 2 is a fragmentary view along the line 2—2 of FIG. 1;

FIG. 3 is a sectional view taken along the line 3—3 of FIG. 2;

FIG. 4 is an enlarged perspective view showing the line gripping portion of my invention in greater detail;

FIG. 5 shows a modification of my invention; and

FIG. 6 is a section on the line 6—6 of FIG. 5.

Turning now to FIG. 1, there is shown a fishing rod 10 having a line guide tip 11 at one end and a handle 12 at the other end carrying a reel 14. Line 15 from the reel passes through tip 11 and carries a hook 16 with suitable bait 17.

My accessory is generally identified by the numeral 20, and comprises a base 21 shown as a flat disc of rigid plastic traversed at its center by a resilient bifurcated member or clip 22 which holds the base to the rod as shown in FIG. 3. Clip 22 also secures to base 21 a bite signal member in the form of a spring wire 19 having a quick-thread line guide 23 at one end and bend at 24 near the other end to continue as a sinuous extension 25 secured to base 21 by clip 22. The end 26 of wire 19 is bent slightly away from base 21, and the final curve 27 of extension 25 may also be bent slightly away from base 21 to provide a gripping portion 30 for holding line 15 if it is drawn between portion 30 and base 21.

Another embodiment of my invention is shown in FIGS. 5 and 6. Here the base 31 is a block of flexible plastic, traversed by clip 32 near its center. Spring wire 33 has a line guide 34 and is bent at 35 to lie along the top of base 31. It is bent back on itself at 36, both portions 37 and 40 being engaged by clip 32, and the end 41 may be bent inward to penetrate base 31. The bend 36 may be bent slightly away from base 31 to enable line to be easily drawn into gripping relation between portions 37 and 40 and base 31.

OPERATION

An angler using my invention selects a unit 20 of the desired stiffness for the fishing conditions, the controlling factor ordinarily being the weight of the hook, bait and any sinker desired. He snaps the clip 22 or 32 of the base over the rod, at a distance from tip 11 which he feels preferable. The line 10 is already passed through tip 11, and hook 16 may have received bait 17. The angler threads the line through guide 24, lowers the bait into the water and allows it to sink to the desired depth by drawing line from reel 14. Next he passes the line between member 29 and base 31, or between members 37 and 40 and base 31. Whether hand held or laid on the surface of the ground or the ice, the bait now remains at the desired depth, and the angler can draw off from reel 14 a further amount of line which will give his preferred amount of slack.

When a fish bites the bait, or even nibbles at it, guide 24 or guide 34 moves visibly with respect to the tip of the rod, attracting the angler's attention. When a fish applies tension to the line, the latter pulls out of the gripping means, allowing the fish to take up the prearranged slack, after which the reel starts to turn and the angler proceeds to play and land the fish.

Numerous objects and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size and arrangement of parts, within the principal of the invention, to the full extent indicated by the broad general meaning of the terms in which the appended claims are expressed.

I claim as my invention:

1. An anglers' accessory comprising in combination:
   a base member having a flat surface;
   a bifurcated resilient member for removably and adjustably securing said base member to a fishing rod;
   a bite signaling element secured to said base member and comprising a resilient member extending from said base at an angle thereto and having a quick-thread line guide at its end remote therefrom;
   and means secured to said base for releasably and frictionally gripping a line passing to said line guide.

2. Apparatus according to claim 1 in which the last named means is unitary with said signaling means.

3. Apparatus according to claim 1 in which said bifurcated member also secures said signaling means to said base member.

4. Apparatus according to claim 2 in which said bifurcated member also secures said signaling means to said base member.

* * * * *